United States Patent [19]

Peacock et al.

[11] Patent Number: 5,086,801
[45] Date of Patent: Feb. 11, 1992

[54] VACUUM PROCESSING SYSTEM AND METHOD

[75] Inventors: Roy N. Peacock, Lafayette; Lee E. Vestman, Lakewood, both of Colo.

[73] Assignee: MKS Instruments, Inc., Andover, Mass.

[21] Appl. No.: 674,433

[22] Filed: Nov. 19, 1990

Related U.S. Application Data

[63] Continuation of Ser. No. 431,825, Nov. 6, 1989, abandoned.

[51] Int. Cl.$^5$ .............................................. G05D 16/06
[52] U.S. Cl. .................................... 137/12; 137/494; 137/907; 251/58
[58] Field of Search .................. 137/12, 494, 907; 251/58

[56] References Cited

U.S. PATENT DOCUMENTS

| | | |
|---|---|---|
| 2,445,163 | 7/1948 | Williamson . |
| 2,744,719 | 5/1956 | McRae . |
| 2,950,730 | 8/1960 | Svensson .............................. 137/907 |
| 3,929,314 | 12/1975 | Stratynski . |
| 4,073,465 | 2/1978 | Sheppard . |
| 4,194,526 | 3/1980 | Stromberg ........................... 137/907 |
| 4,299,373 | 11/1981 | Troyer . |
| 4,316,597 | 2/1982 | Goodman et al. . |

Primary Examiner—Robert G. Nilson
Attorney, Agent, or Firm—Sixbey, Friedman, Leedom & Ferguson

[57] ABSTRACT

A vacuum processing system and method by which system turbulence is reduced utilizing a vacuum responsive flow controlling valve that is located between a vacuum pump and a vacuum processing chamber to restrict the rate of pumpdown. A valve member of the flow controlling valve, such as a butterfly valve closure plate, is positionally shifted by a pressure differential responsive actuator as a function of the extent to which the pressure in the vacuum processing chamber has been reduced by the pump. During the initial phase of pumpdown, the valve closure member is in its maximally closed position, with evacuation of the vacuum processing chamber occurring solely through a leakage path past the valve member. After a predetermined pressure is reached, the valve member slowly opens as the pressure differential in the actuator increases, until a maximally open position is achieved.

20 Claims, 3 Drawing Sheets

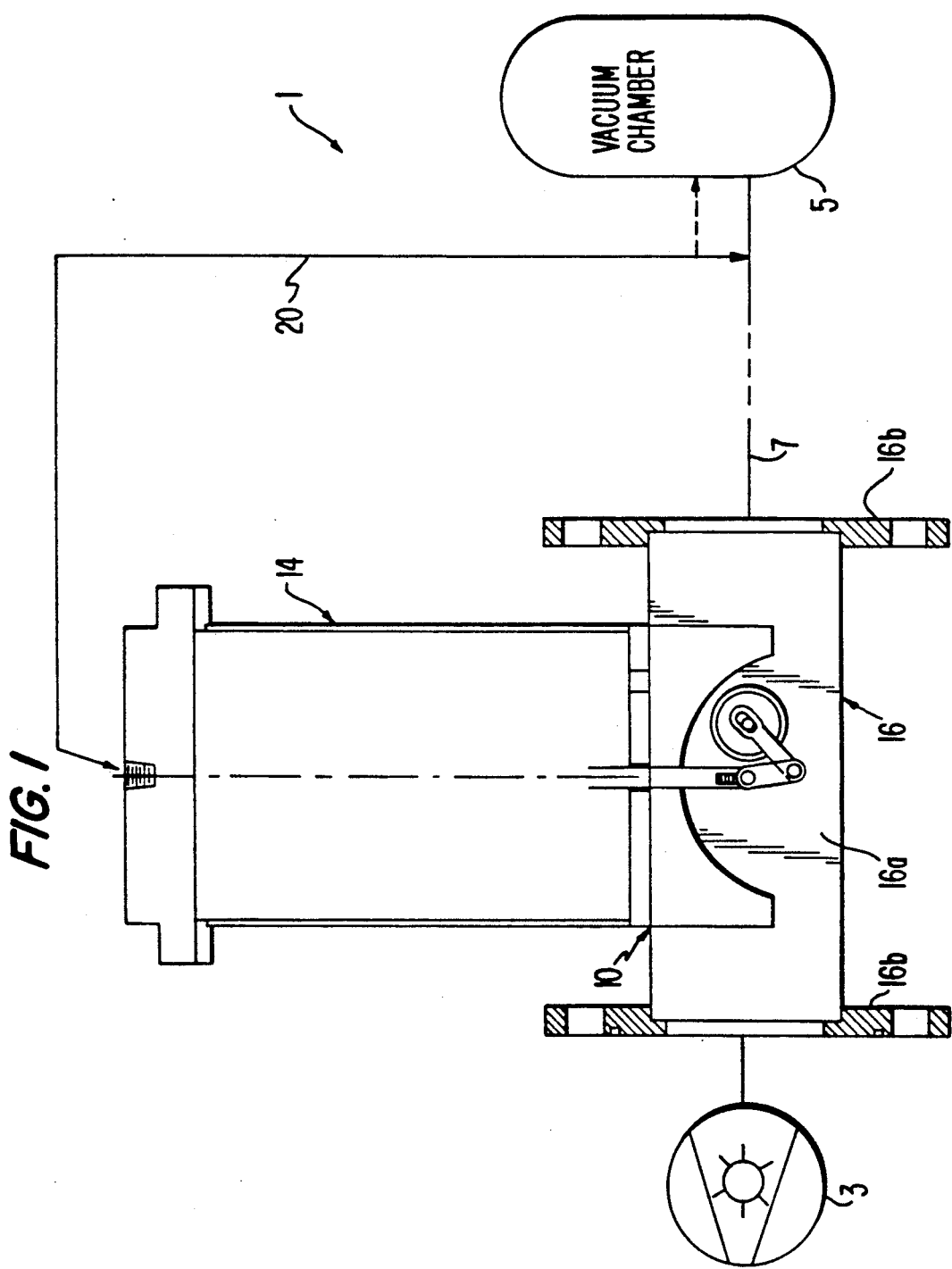

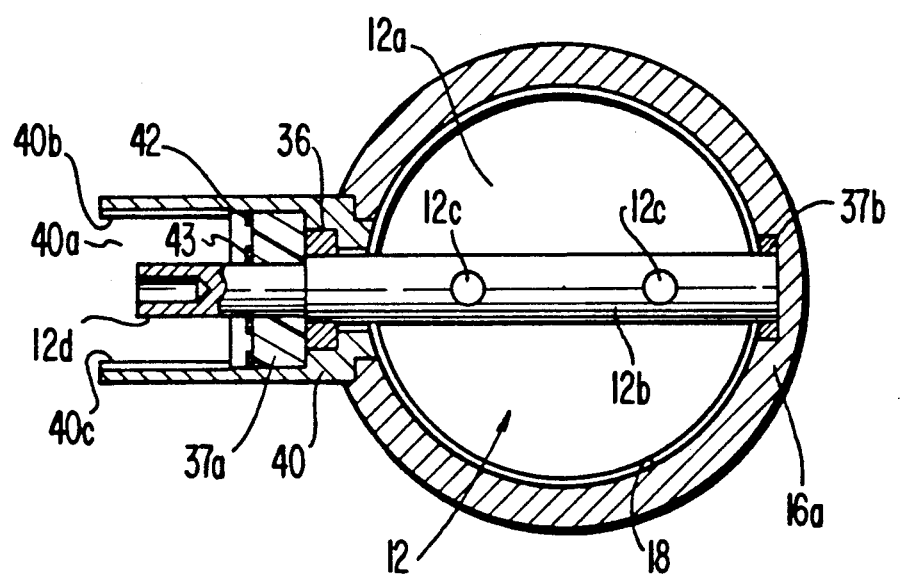

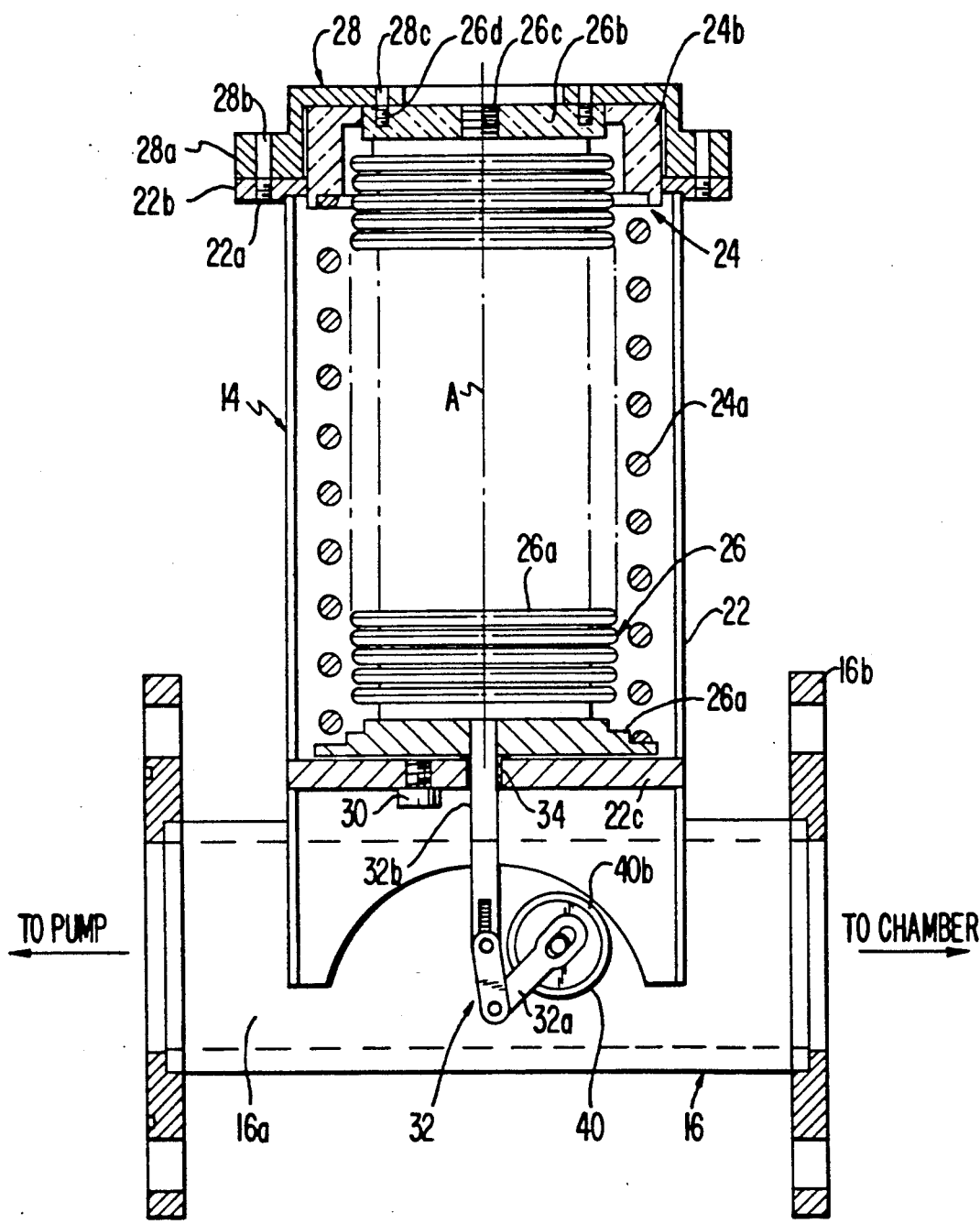

VACUUM PROCESSING SYSTEM AND METHOD

This application is a Continuation of Ser. No. 431,825, filed Nov. 6, 1989, now abandoned.

BACKGROUND OF THE INVENTION

1. Field of the Invention

The present invention relates to systems and methods wherein a pump is utilized to draw a vacuum within a work processing chamber. Particularly, the present invention relates to the use of a vacuum responsive throttle valve for regulating the pumpdown phase of a process with the system.

2. Description of Related Art

In numerous industries, processes must be carried out within a vacuum. For example, in the polymer, pharmaceutical, munitions, and pigment industries, powders are dried in vacuum, as are particular construction materials. In such cases, if a vacuum is drawn too rapidly, associated turbulence can result along with a so-called "puffing" of the particulate matter (i.e., a sudden upheaval of the material due to the initial surge in the system). In turn, the dislodged particles can cause clogging of the filter that is normally provided between the pump and the vacuum processing chamber. Furthermore, in the case of very fine powders, some of the powder can even pass through the filter and reach the pump, thereby potentially damaging the pump itself.

Likewise, problems can occur if initial pumpdown occurs to rapidly during degassing of liquids, since splattering can result, and analogous problems exist in pulp and paper processing, as well as in the performance of pressure-dependent chemical reactions. Likewise, in silicon wafer processing as occurs in the semiconductor industry, work surface contamination from airborne particulates is a significant problem, which is, in part, affected by system turbulence which results in the contamination or aggregation of particulate in a system component.

Still further, because liquid ring pumps are less of an environmental contaminant and are more energy efficient than two-stage steam ejectors, companies having two-stage steam ejectors can benefit from replacing them with a liquid ring pump. However, liquid ring pumps have a much more rapid pumpingdown capability than steam ejectors, so that, in many cases, there is a need to throttle-down the liquid ring pump for it to be usable, because of a need to reduce turbulence and/or increase the pumpdown time.

It would be possible to achieve a slowing-down of the pumpdown process by providing the pump with a programmable logic controller. However, such are costly and not readily adaptable to all existing vacuum pump systems.

Vacuum responsive, spring-biased, diaphragm-type valves controllers are known for use in shifting the position of a butterfly valve in response to changes in the vacuum pressure to which it is exposed. For example, Troyer U.S. Pat. No. 4,299,373; Sheppard U.S. Pat. No. 4,073,465; and Stratynski U.S. Pat. No. 3,929,314, all show such controllers used in conjunction with butterfly-type fluid flow control valves. However, in each of these patents, the vacuum used for controlling the position of the butterfly valve plate is drawn from the vacuum manifold of an engine for regulating the flow of a liquid through the cooling system of the engine as a function of engine operating conditions, as opposed to responding to the pressure of the controlled flow. Furthermore, in all of these butterfly-type throttle valves, no flow is permitted across the butterfly valve plate when the valve plate is in its closed position.

Additionally, the use of the pressure of a controlled fluid for controlling the position of a valve in a supply conduit for the fluid is also known. Typical of such arrangements are Williamson U.S. Pat, No. 2,445,163; McRae U.S. Pat. No. 2,744,719; and Goodman, et al. U.S. Pat. No. 4,316,597. However, none of these devices are designed so as to be capable of being vacuum responsive, and thus, none of these systems deal with any of the various factors of significance in vacuum processing systems and methods. In fact, as opposed to providing a slow, automatic opening of a throttle valve, the Williamson patent is manually controlled by a hand lever, and the McRae patent is designed to produce a quick opening and closing, as opposed to a deliberately slow one.

Thus, there is a need for a simple and inexpensive flow control system and process for obtaining vacuum processing under conditions where a slow pumpingdown of the system is achieved, and especially, in a manner that can be adapted to virtually any system, irrespective of the type of vacuum pump involved.

SUMMARY OF THE INVENTION

It is a primary object of the present invention to provide a system and method by which initial pumpdown flow is restricted to reduce flow turbulence within the system.

It is a further object of the present invention to achieve the preceding object in a simple and inexpensive manner; particularly, by the incorporation of a vacuum responsive flow controlling valve means between the pump and the vacuum processing chamber.

These and other objects of the invention are achieved by incorporating a vacuum responsive flow controlling valve into a vacuum processing system having a vacuum pump, a vacuum processing chamber, and a vacuum line interconnecting the low pressure side of the vacuum pump with the vacuum processing chamber. A valve member of the flow controlling valve, such as a butterfly valve closure plate, is disposed in the vacuum line and its position is shifted by a pressure differential responsive actuator which is in communication with a pressure signal that at least closely corresponds to that in the vacuum processing chamber. Furthermore, a leakage path is provided across the valve member when the valve member is in its maximally closed position. When pumping is initiated, the valve member remains closed, under the action of the pressure-responsive controller, until a predetermined vacuum level is reached, so that initial pumpingdown of the vacuum processing chamber occurs exclusively through the leakage path. Once the predetermined pressure is achieved, the valve member slowly opens as the pressure differential on the actuator increases until a full open position is achieved.

In accordance with a preferred embodiment, the leakage path is formed by an annular gap between peripheral edge of the butterfly closure plate and the surrounding wall of the vacuum line. Furthermore, the pressure differential responsive actuator has a spring-biased metal bellows which acts upon the butterfly valve closure plate via a linkage, with the maximally open and closed positions being 90 degrees apart, and dictated by respective stops for the linkage formed by an interface socket of a shaft seal for the shaft of the butterfly valve closure plate. The initial opening pressure is set and controlled via a replaceable guide shim for the spring of the actuator, and advantageously, causes the progressive opening of the valve member to be commenced after the vacuum pressure in the vacuum processing chamber has decreased to approximately 275 torr, for example.

These and other objects, features, and advantages of the present invention will become more apparent from the following detailed description, when viewed in conjunction with the accompanying drawings.

BRIEF DESCRIPTION OF THE DRAWINGS

FIG. 1 is a schematic depiction of a vacuum processing system in accordance with the present invention;

FIG. 2 is a cross-sectional view through a vacuum pipe segment of the FIG. 1 system showing the valve member in its maximally closed position; and FIG. 3 is a partial cross-sectional view of a vacuum responsive flow controlling valve unit in accordance with a preferred embodiment of the present invention.

DETAILED DESCRIPTION OF THE PREFERRED EMBODIMENT

With reference to FIG. 1, a vacuum processing system, designated generally by the reference numeral 1, is shown as having a vacuum pump 3 interconnected, at its low pressure side, with a vacuum processing chamber 5 via a vacuum line 7. In this regard, it is noted that the term "chamber" is used throughout this application in the broadest sense of the word as being any form of enclosed space or cavity, and can range from a small vessel used in performing pressure-dependent chemical reactions in laboratories to large tanks, bins, or the like, used for drying of polymer, pharmaceutical, munitions, and pigment powders or for the degassing of liquids, or in pulp and paper processing, and including roomsize enclosures for drying of construction materials and for producing electronic components in the semiconductor industry, for example.

For regulating the rate at which the vacuum processing chamber is evacuated of gases by the vacuum pump 3, a vacuum responsive flow controlling valve, designated 10 as a whole, is interposed in the vacuum line 7. The flow controlling valve 10 is comprised of a valve member 12 (see FIG. 2) that is disposed in the vacuum line 7 for regulating its flowthrough cross section, and a pressure differential responsive actuator 14. In order to enable the flow controlling valve 10 to respond in a manner that at least closely corresponds to the vacuum conditions in the vacuum chamber, a pressure sensing line 20 extends between the pressure responsive actuator 14 and either the vacuum processing chamber 5 or the vacuum line 7 at a point in close proximity to the vacuum processing chamber 5, thereby exposing one side of the actuator 14 to a pressure that closely corresponds to that in the vacuum processing chamber 5.

As can be seen from FIG. 2, valve member 12 can be in the form of a typical butterfly valve closure plate 12a that is mounted to a shaft 12b via, for example, "NY-LOCK" type fasteners. The valve member 12 is normally biased into its maximally closed position, illustrated in the drawings, by a valve actuator 14, which is described in greater detail below. In this maximally closed position, a leakage path exists for communicating the portion of the vacuum line at an upstream side of the valve member 12 with that at the downstream side of the valve member for enabling the pump 3 to evacuate the vacuum processing chamber 5, even in the maximally closed position of valve member 12.

To create this leakage path, the area of the valve closure plate is slightly less than that of the cross-sectional area of the vacuum line 7 at the portion thereof formed by vacuum line interface 16, which is comprised of a pipe section 16a and a pair of mounting flanges 16b. Most easily, this result is achieved by making the diameter of closure plate 12a sufficiently smaller than the inner diameter of the vacuum line pipe section 16a, or by simply eliminating the peripheral gasket seal from a conventional butterfly-type valve. In this way, an annular clearance gap 18 is provided that can serve as the leakage path across the closure plate 12a of the valve member 12. Of course, other means for forming the leakage path can be utilized; for example, plate 12a could be notched or provided with throughholes, or an external bypass line could serve this purpose as well, or a stop, as described below, could set the maximally closed position at a point before the valve closure plate 12a is oriented perpendicular to the flow passage, i.e., the maximally closed position is not a fully closed position.

A preferred form for the valve actuator 14 is illustrated in FIG. 3. In particular, the valve actuator 14 comprises a hollow cylindrical actuator body 22 within which is disposed a control spring assembly 24 and a bellows assembly 26. The actuator body 22 is rigidly attached to pipe section 16a at one end, and is closed at an opposite end by a closure cap 28 in order to retain the control spring assembly 24 and bellows assembly 26 in place within its interior. For purposes of detachably securing the closure cap 28 in place, it is provided with a perimetric retaining flange which has a plurality of throughholes 28b, through which securing bolts (not shown) may be passed and threaded into engagement with tapped holes 22a of a corresponding flange 22b of the actuator body 22.

The spring assembly 24 is comprised of a coil spring 24a and a guide shim 24b. The coil spring 24a determines the valve opening rate in accordance with its spring constant, a spring constant of 11 pounds per inch having been found to be suitable for achieving a rate of opening that prevents turbulence and an initial pressure surge.

While the spring 24a determines the rate at which the valve member 12 will open, the guide shim, in addition to serving as a holder for one end of the spring 24a, determines the pressure at which the valve member 12 will commence opening. That is, the height of the shim guide 24b sets the level of prestress imposed upon the spring 24a, which must be exceeded before the spring can be compressed further. Thus, the shim guide 24b is designed to be an exchangeable component in order to allow customizing of the point at which valve opening commences to the needs of the particular process with which the system is being utilized; for example, for uses such as powder drying processes, it has been found advantageous to defer opening of the valve member 12 until the pump lowers the pressure at the chamber 5 from atmospheric pressure (760 torr) to below 275 torr (in such a case, with an 11 lb./in. spring constant, a 70 lb. prestress should be produced by the shim guide 24b). Once the pressure differential acting on the bellows assembly 26 overcomes the spring force acting on it, the spring assembly 24 and the bellows assembly 26 contract linearly.

The bellows assembly 26 is comprised of a bellows 26a, a fixed end plate 26b, and a movable end plate 26c. Bellows 26a is formed of a thin-walled metal, such as stainless steel, of 0.006 inch thickness, for example. Fixed end plate 26b is held in place by being secured by bolts (not shown) that are inserted through throughholes 28c of closure cap 28, and then threaded into tapped holes 26d of the fixed end plate 26b. Fixed end plate 26b is formed of the same material as the bellows, e.g., stainless steel, and is welded to one end of the bellows (the top end as shown in FIG. 3). In order to communicate the pressure in pressure sensing line 20 with the interior of bellows 26, the fixed end plate 26b is provided with a threaded opening 26e, into which a fitting for the pressure sensing line 20 can be screwed.

In order to close the opposite end of bellows 26a the movable end plate 26c is welded thereto. Additionally, end plate 26c is provided with a flange against which spring 24a abuts for biasing the bellows toward its expanded condition. In this regard, in the expanded condition illustrated in FIG. 3, the bellows is extended beyond its neutral position (by approximately 10 percent) into a tensioned condition, so as to minimize the stroke and stress imposed upon the bellows. Furthermore, in order for air to breathe in and out of the actuator body 22 as the bellows assembly 26 expands and contracts, and to ensure that the exterior of the bellows assembly is exposed to atmospheric pressure, an air filter 30 is inserted into a throughhole in the bottom wall 22c of the actuator body 22. Air filter 30 can be in the form of a sintered brass plug.

In order for the actuator 14 to cause movement of the valve member 12, a mechanical linkage 32 is provided. A shaft 32b at one end of linkage 32 extends through a bronze bushing 34 and is secured to movable end plate 26c so as to be coaxially aligned with the central axis A of the spring and bellows assemblies 24, 26. A link 32a at the opposite end of linkage 32 is attached to the end 12d of the shaft 12b of valve member 12. The mechanical linkage 32 acts to convert the linear movement of the bellows assembly 26 to a rotational movement of the actuating member 12.

Since lubricants cannot be utilized in a high vacuum environment, shaft 12b is mounted for rotation in a shaft lip seal 36 and shaft bushings 37a and 37b which are formed of a polymeric type material such as "DELRIN" or "TEFLON". Shaft bushing 37a is mounted in an interface socket 40 with outer and inner diameter snap rings 42, 43 being used to axially hold the shaft 12b and the shaft bushing 37a in place. The interface socket 40 also serves for limiting the angular displacement of the valve member 12 by the actuator 14 to 90 degrees of motion between the illustrated maximally closed position of the closure plate 12a (oriented perpendicular to the longitudinal axis of pipe section 16a) and a maximally open position wherein the plate forms a negligible restriction to flow through pipe section 16a (disposed edgewise to axis of flow through pipe section 16a).

For the purpose of limiting angular rotation of valve member 12, interface socket 40 is provided with a cutout 40a which creates a pair of abutment edges 40b, 40c. Link 32a extends through cutout 40 and thus, will abut against abutment edges 40b, 40c at the desired stroke end points. In FIGS. 1 and 2 the linkage 32 is shown in abutting engagement with edge 40c.

In use, for performing vacuum processes of the type described initially, pump 3 is turned on and valve member 12 remains in its, at rest, closed position due to the force of spring assembly 24 acting on it via the linkage 32. As a result, vacuum pressure will be drawn very slowly on the vacuum processing chamber 5, via the vacuum line 7, due to the fact that the closed valve member produces a restriction in the vacuum line 7 which limits flow to the annular gap around the periphery of the valve member.

At the same time as the pressure in the vacuum processing chamber 5 is lowered, that pressure is communicated with the interior of bellows assembly 26 via the vacuum sensing line 20. However, during the initial pumpdown phase, the pressure differential on the opposite sides of the bellows assembly 26 is insufficient to overcome the force applied by the spring assembly.

On the other hand, once the pressure differential on the bellows assembly is sufficient to overcome the pre-stressing force on the spring 24a (set by the guide shim 24b), a linear contracting movement of the bellows assembly 26 will occur. In this regard, since the end plate 26b is fixed to the closure cap 28, contraction of the bellows assembly 26 will result in lifting of the movable end plate 26c, from the illustrated position, thereby compressing spring 24a and drawing mechanical linkage 32 upward with it.

Upward movement of linkage 32 will cause the closure member 12 to solely rotate until the maximally open position is achieved, at which point linkage 32 is stopped from further movement by the abutment edge 40b of the interface socket 40. The valve member 12 will remain in this position for the remainder of the pumpdown phase.

Once the vacuum processing chamber 5 has been sufficiently evacuated, processing within the chamber, such as drying, silicon wafer processing or the like, can be commenced. After completion of the processing operation, the system is vented and as the system is brought back up past the initial opening pressure of the valve, the valve returns to its closed position.

Due to the slow pumpdown phase achieved with the the present invention, turbulence and pressure surges in the vacuum processing chamber 5 are avoided. As a result, particulate matter, that can clog system filters, especially filters of the reverse flow, shaker, and baghouse types, is not dislocated, thereby minimizing the need to backflush filters and the potential for particulates reaching the pump. Furthermore, these benefits are achieved in a universally applicable manner without having to invest in costly programmable logic controllers.

While we have shown and described various embodiments in accordance with the present invention, it is understood that the invention is not limited thereto, but is susceptible of numerous changes and modifications as known to those skilled in the art. Therefore, we do not wish to be limited to the details shown and described herein, and intend to cover all such changes and modifications as are encompassed by the scope of the appended claims.

We claim:
1. Vacuum processing system comprising:
 (A) a vacuum pump;
 (B) a vacuum processing chamber enclosing a space that is sealed by the chamber itself relative to the atmosphere during operation of the pump and in which a vacuum effect produced by said pump is utilized;

(C) a vacuum line interconnecting a low pressure side of said vacuum pump with said vacuum processing chamber; and (D) a vacuum responsive flow controlling valve means for regulating the rate at which said vacuum processing chamber is evacuated of gases by said vacuum pump, a first portion of said vacuum line extending from said pump to said valve means and a second portion of said vacuum line extending from said valve means to said vacuum processing chamber;

wherein said flow controlling valve means has a valve member disposed in said vacuum line for regulating the flowthrough cross section of the vacuum line and a pressure differential responsive actuator means for shifting the position of said valve member in direct relation to the degree of evacuation of said enclosed space by said pump relative to ambient pressure; wherein a pressure sensing line is provided as a means for communicating a first side of said pressure differential responsive actuator means with a point in the system at which a pressure exists that at least closely corresponds to that in said vacuum processing chamber, said point in the system being at least as far upstream from said valve member relative to said pump as an upstream end portion of said second portion of the vacuum line that is in proximity to said closed vacuum processing chamber; wherein a second, opposite side of said actuator means is exposed to ambient pressure; and wherein a leakage path is provided for communicating said vacuum line at an upstream side of said valve member with said vacuum line at a downstream side of said valve member in a maximally closed position of said valve member.

2. Vacuum processing system according to claim 1, wherein said actuator means comprises a spring assembly and a metal bellows which is spring-biased toward an expanded condition by said spring assembly.

3. Vacuum processing system according to claim 2, wherein said spring assembly comprises a spring and a guide shim engaged thereby, said guide shim forming an exchangeable means for setting a prestress level on the spring to adjustably set the pressure level at which the valve member will initially open.

4. Vacuum processing system comprising:
(A) a vacuum pump;
(B) a vacuum processing chamber;
(C) a vacuum line interconnecting a low pressure side of said vacuum pump with said vacuum processing chamber; and
(D) a vacuum responsive flow controlling valve means for regulating the rate at which said vacuum processing chamber is evacuated of gases by said vacuum pump;

wherein said flow controlling valve means has a valve member disposed in said vacuum line for regulating the flowthrough cross section of the vacuum line and a pressure differential responsive actuator means for shifting the position of said valve member; wherein a pressure sensing line is provided as a means for communicating a first side of said pressure differential responsive actuator means with a point in the system at which a pressure exists that at least closely corresponds to that in said vacuum processing chamber; wherein a second, opposite side of said actuator means is exposed to ambient pressure; wherein a leakage path is provided for communicating said vacuum line at an upstream side of said valve member with said vacuum line at a downstream side of said valve member in a maximally closed position of said valve member; and wherein said valve member comprises a butterfly valve closure plate of an area that is slightly less than the cross-sectional area of said vacuum line for providing said leakage path.

5. Vacuum processing system according to claim 4, wherein said actuator means comprises a spring assembly and a metal bellows which is spring-biased toward an expanded condition by said spring assembly.

6. Vacuum processing system according to claim 5, wherein said spring assembly comprises a spring and a guide shim engaged thereby, said guide shim forming an exchangeable means for setting a prestress level on the spring to adjustably set the pressure level at which the valve member will initially open.

7. Vacuum processing method comprising the steps of:
A) turning on a vacuum pump which has a low pressure side connected to a vacuum processing chamber via a vacuum line having a valve member of a vacuum responsive flow controlling valve disposed therein between the pump and said chamber;
B) allowing gases to be evacuated by said pump from said vacuum processing chamber while said valve member is in a maximally closed position via a leakage path communicating said vacuum line at an upstream side of the valve member with the vacuum line at a downstream side of the valve member;
C) communicating a pressure which at least closely corresponds to the pressure in said vacuum processing chamber with a vacuum responsive actuator means of the controlling valve for shifting the position of the valve member; and
D) progressively opening said vacuum line by shifting the valve member in response to decreases in the pressure communicated to said vacuum responsive actuator means, whereby initial pumpdown of said vacuum processing chamber is restricted for reducing turbulence within the vacuum processing chamber.

8. Vacuum processing method according to claim 7, wherein said method further comprises the vacuum drying of particulate matter.

9. Vacuum processing method according to claim 8, wherein said progressive opening step is commenced after the vacuum pressure communicated to the vacuum responsive actuator means has decreased to approximately 275 torr.

10. Vacuum processing method according to claim 7, wherein said method further comprises the degassing of a liquid.

11. Vacuum processing method according to claim 7, wherein said method further comprises the performance of a pressure-dependent chemical reaction.

12. Vacuum processing method according to claim 7, wherein said progressive opening step is commenced after the vacuum pressure communicated to the vacuum responsive actuator means has decreased to approximately 275 torr.

13. Vacuum processing system comprising:
(A) a vacuum pump;
(B) a closed vacuum processing chamber;
(C) a vacuum line interconnecting a low pressure side of said vacuum pump with said vacuum processing chamber; and (D) a vacuum responsive flow controlling valve means for regulating the rate at which said vacuum processing chamber is evacuated of gases by said vacuum pump;

wherein said flow controlling valve means has a valve member disposed in said vacuum line for regulating the flowthrough cross section of the vacuum line and a pressure differential responsive actuator means for shifting the position of said valve member; wherein a pressure sensing line is provided as a means for communicating a first side of said pressure differential responsive actuator means with a point in the system at which a pressure exists that at least closely corresponds to that in said vacuum processing chamber, said point being located upstream of said flow controlling valve means relative to said vacuum pump, and said pressure sensing line being the exclusive means by which the pressure differential actuator means is exposed to vacuum suction effects produced by the vacuum pump; wherein a second, opposite side of said actuator means is exposed to ambient pressure; and wherein a leakage path is provided for communicating said vacuum line at an upstream side of said valve member with said vacuum line at a downstream side of said valve member in a maximally closed position of said valve member.

14. Vacuum processing system according to claim 13, wherein said pressure differential responsive actuator means is operable to produce a delayed shifting of the valve member from the maximally closed position after commencement of pump operation and a delay in returning of the valve member toward said maximally closed position after venting of the system has commenced, whereby a slow pumpdown phase is produced for avoiding pressure surges once said valve member is opened and the vacuum chamber remains in communication with said pump during operation thereof.

15. Vacuum processing system comprising:
(A) a vacuum pump;
(B) a vacuum processing chamber defining a fully enclosed space during operation of the pump and in which a vacuum effect produced by said pump is utilized;
(C) a vacuum responsive flow controlling valve means for regulating the rate at which the fully enclosed space is evacuated of gases by said vacuum pump;
(D) a first vacuum line means for interconnecting a low pressure side of the vacuum pump with said vacuum responsive flow controlling valve means; and
(E) a second vacuum line means for interconnecting said vacuum responsive flow controlling valve means with the fully enclosed space;

wherein said flow controlling valve means has a vacuum line section for connecting said first and second vacuum line means, a valve member disposed in the vacuum line section for regulating the flowthrough cross section of the vacuum line section, and a pressure differential responsive actuator means for shifting the position of said valve member; wherein said pressure differential responsive actuator means includes an actuator member that has one end interconnected with said valve member, a pressure sensing line means for communicating a first side of said actuator member with a point at which a vacuum pressure is to be sampled as a means for displacing the valve actuating member in a direction acting to open said valve member, means for exposing a second, opposite side of said valve actuating member to ambient pressure, means for acting on said valve actuating member in a direction opposite to the vacuum pressure communicated to the first side of the valve actuating member in a manner controlling the rate at which the valve member is opened by said valve actuating member in response to a negative pressure differential between ambient pressure and that sampled by said pressure sensing line so as to produce controlled progressive opening of the valve member as a result of incremental increases in said negative pressure differential; and wherein a leakage path is provided for communicating said first vacuum line means with said second vacuum line means in a maximally closed position of said valve member.

16. Vacuum processing system comprising: a vacuum responsive flow controlling valve means for regulating the rate at which a fully enclosed space is evacuated of gases by a vacuum pump; a first vacuum line means for interconnecting a low pressure side of a vacuum pump with said vacuum responsive flow controlling valve means; and a second vacuum line means for interconnecting aid vacuum responsive flow controlling valve means with the fully enclosed space;

wherein said flow controlling valve means has a vacuum line section for connecting said first and second vacuum line means, a valve member disposed in the vacuum line section for regulating the flowthrough cross section of the vacuum line section, and a pressure differential responsive actuator means for shifting the position of said valve member; wherein said pressure differential responsive actuator means includes an actuator member, a pressure sensing line means for communicating a first side of said actuator member with a point at which a vacuum pressure is to be sampled as a means for displacing the valve actuating member in a direction acting to open said valve member, means for exposing a second, opposite side of said valve actuating member to ambient pressure, means for acting on said valve actuating member in a direction opposite to the vacuum pressure communicated to the first side of the valve actuating member in a manner controlling the rate at which the valve member is opened by said valve actuating member in a manner controlling the rate at which the valve member is opened by said valve actuating member in response to a negative pressure differential between ambient pressure and that sampled by said pressure sensing line so as to produce controlled progressive opening of the valve member as a result of incremental increases in said pressure differential; and wherein a leakage path is provided for communicating said first vacuum line means with said second vacuum line means in a maximally closed position of said valve member.

17. Vacuum processing system according to claim 16, comprising means for setting a minimum value of said negative pressure differential at which said valve actuating member will commence opening of the valve member.

18. Vacuum processing system according to claim 17, wherein said means for acting on the valve actuating member for controlling the rate at which said valve member will be displaced in said direction acting to open the valve member comprises a spring.

19. Vacuum processing system according to claim 18, wherein said means for setting a minimum value of said pressure differential comprises means for prestressing said spring.

20. Vacuum processing system according to claim 19, wherein said means for prestressing said spring comprises an exchangeable component for holding an end of said spring.

* * * * *